(12) United States Patent
Forster

(10) Patent No.: US 7,319,393 B2
(45) Date of Patent: Jan. 15, 2008

(54) RFID TAGS FOR ENABLING BATCH READING OF STACKS OF CARTONS

(75) Inventor: Ian James Forster, Chelmsford (GB)

(73) Assignee: Avery Dennison Corporation, Pasadena, CA (US)

( * ) Notice: Subject to any disclaimer, the term of this patent is extended or adjusted under 35 U.S.C. 154(b) by 401 days.

(21) Appl. No.: 10/875,033

(22) Filed: Jun. 22, 2004

(65) Prior Publication Data
US 2005/0280512 A1    Dec. 22, 2005

(51) Int. Cl.
G08B 13/14    (2006.01)

(52) U.S. Cl. .............. 340/572.1; 340/568.1; 340/10.3; 340/825.49; 340/571; 340/572.7

(58) Field of Classification Search .. 340/572.1–572.9, 340/568.1, 10.1, 825.36, 825.49, 505, 571, 340/10.3, 10.5
See application file for complete search history.

(56) References Cited

U.S. PATENT DOCUMENTS

| | | | |
|---|---|---|---|
| 3,765,007 A | 10/1973 | Elder | |
| 5,349,332 A | 9/1994 | Ferguson et al. | |
| 5,450,492 A | 9/1995 | Hook et al. | |
| 5,604,485 A | 2/1997 | Lauro et al. | |
| 5,661,457 A | 8/1997 | Ghaffari et al. | |
| 5,686,902 A | 11/1997 | Reis et al. | |
| 5,708,423 A | 1/1998 | Ghaffari et al. | |
| 5,726,630 A * | 3/1998 | Marsh et al. | 340/10.2 |
| 5,777,561 A * | 7/1998 | Chieu et al. | 340/10.32 |
| 5,777,884 A | 7/1998 | Belka et al. | |
| 5,859,587 A | 1/1999 | Alicot et al. | |
| 5,936,527 A * | 8/1999 | Isaacman et al. | 340/572.1 |
| 6,002,344 A | 12/1999 | Bandy et al. | |
| 6,104,311 A * | 8/2000 | Lastinger | 340/10.51 |
| 6,127,928 A * | 10/2000 | Issacman et al. | 340/572.1 |

(Continued)

FOREIGN PATENT DOCUMENTS

WO    WO 01/90849 A2    11/2001

OTHER PUBLICATIONS

"RFID: Radio Frequency Identification," product brochure printed by Avery Dennison Corporation, Pasadena, California, Oct. 2003.

Primary Examiner—Benjamin C. Lee
Assistant Examiner—Daniel Previl
(74) Attorney, Agent, or Firm—Tarolli, Sundheim, Covell & Tummino LLP

(57) ABSTRACT

A radio-frequency identification (RFID) system including an RFID tag and an RFID-enabled object. The RFID tag may include first and second antennas and an RFID circuit. The antennas receive activation energy from a reader. The tag may also include a transmission line for operatively coupling the RFID circuit to the antennas. The first antenna may receive activation energy which, in turn, may be radiated by the second antenna. The second antenna may also receive tag energy radiated by an antenna of another RFID tag. The received tag energy may then be radiated by the first antenna. When a plurality of the RFID tags are positioned in sequence in operative proximity with each other, activation energy may be propagated through the sequence from one RFID tag to another in one direction, and tag energy may be propagated through the sequence from one RFID tag to another in another direction.

32 Claims, 12 Drawing Sheets

U.S. PATENT DOCUMENTS

| | | | |
|---|---|---|---|
| 6,329,915 B1 * | 12/2001 | Brady et al. | 340/572.1 |
| 6,335,685 B1 | 1/2002 | Schrott et al. | |
| 6,335,686 B1 * | 1/2002 | Goff et al. | 340/572.4 |
| 6,496,806 B1 | 12/2002 | Horwitz et al. | |
| 6,507,279 B2 | 1/2003 | Loof | |
| 6,600,418 B2 * | 7/2003 | Francis et al. | 340/572.1 |
| 7,075,437 B2 * | 7/2006 | Bridgelall et al. | 340/572.1 |
| 2002/0130778 A1 | 9/2002 | Nicholson | |
| 2003/0089771 A1 | 5/2003 | Cybulski et al. | |

* cited by examiner

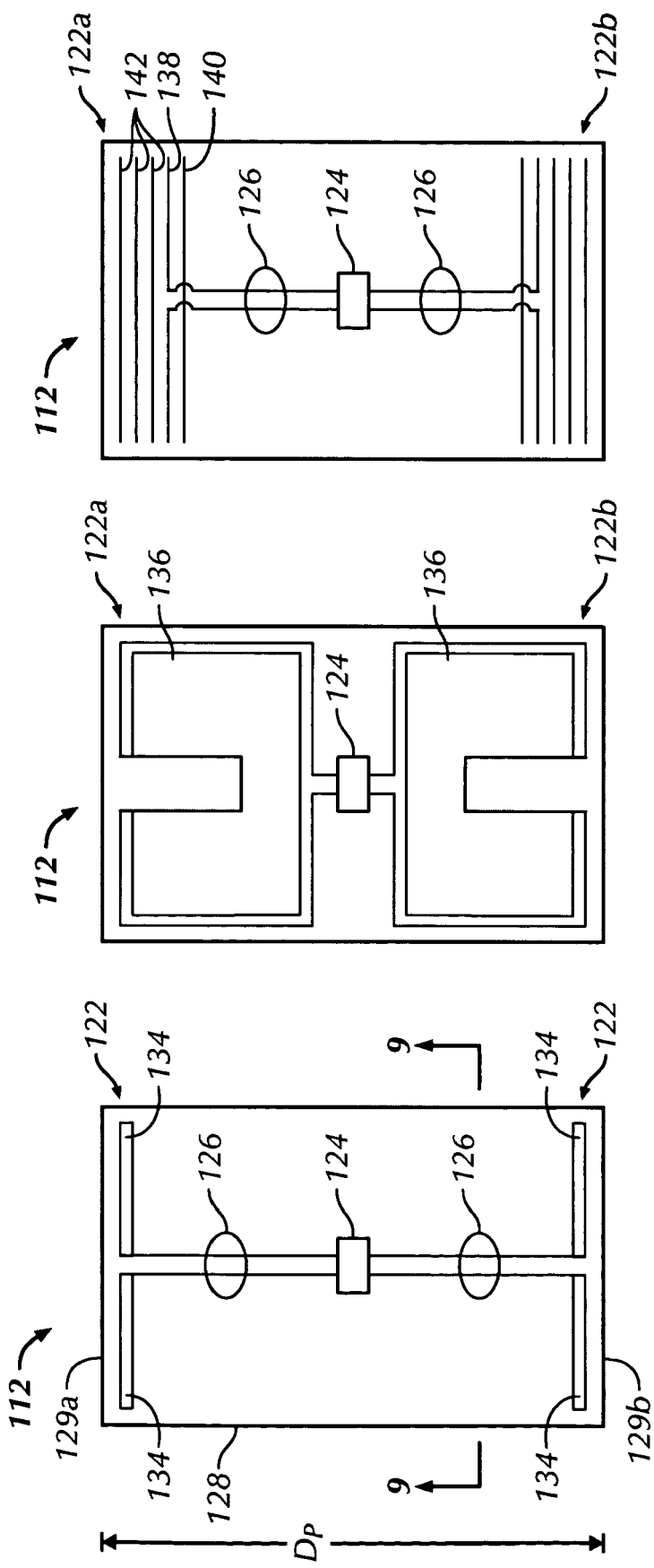

RFID TAGS FOR ENABLING BATCH READING OF STACKS OF CARTONS

BACKGROUND OF THE INVENTION

The present invention relates to radio-frequency identification (RFID) systems, including RFID tags and readers. The invention also relates to RFID apparatus and methodology that enables a plurality of cartons, such as stacked on a pallet, to be read—even the innermost cartons in the stack and even in the presence of RF intolerant material such as liquids and metals.

Automatic identification is the broad term applying to a host of technologies that are used to help machines identify objects. Automatic identification is often coupled with automatic data capture. More specifically, companies want to identify items, to capture information about the items, and to load the information into a computer with minimal human labor.

One type of automatic identification technology is radio-frequency identification (RFID). RFID is a generic term for technologies that use radio waves to automatically identify individual items. There are several conventional methods of identifying objects using RFID, the most common of which is to store a serial number (and other information if desired) that identifies a product on a microchip that is attached to an antenna. The chip and the antenna together are called an RFID transponder or an RFID tag. The antenna enables the chip to receive commands from and to transmit identification information to a reader. The reader converts the radio waves returned from the RFID tag into a form that can then be utilized by a computer.

Accordingly, a conventional RFID system consists of a tag (including a chip with an antenna) and a reader (sometimes call an interrogator) with an antenna. The reader sends out electromagnetic waves that form a magnetic field when coupled with the antenna on the RFID tag. A passive RFID tag draws power from this magnetic field and uses the power to drive or activate the chip. The chip then modulates the waves that are sent back to the reader, and the reader converts the returned waves into digital data.

There are generally two types of RFID tags: active and passive. An active RFID tag utilizes a battery to power the chip and to transmit a signal to a reader (similar to a cell phone transmitting signals). A passive tag does not have a battery but rather is powered by the electromagnetic waves that induce a current in the antenna of the tag. A semi-passive tag uses a battery to power the chip but communicates using electromagnetic waves from the reader.

Similar to an audio radio tuning in to different frequencies, RFID tags and readers are tuned to the same frequency to communicate. RFID systems use many different frequencies, but the most common frequency ranges utilized in RFID systems are low-frequency (about 125 KHz), high-frequency (13.56 MHz), and ultra-high frequency or UHF (about 900 MHz). Microwaves, which have a frequency of about 2.45 GHz, are also used in some applications.

The distance at which an RFID tag can be read is known as the read range. The read range of a passive tag depends on a number of factors: the frequency of operation, the power of the reader, and interference from metal objects or other RF devices. In general, low-frequency tags have a read range of about one foot; high-frequency tags have a read range of about three feet; and UHF tags have a read range of about 20 feet. Where longer read ranges are needed, an active tag with a read range of 300 feet or more can be used.

One of the desired applications of RFID tags is to track goods in a supply chain, particularly at high volumes such as a plurality of cartons stacked on a pallet. One of the inherent difficulties in this application is ensuring that all of the RFID tags associated with all of the cartons are read. For example, if the stack of cartons is a five-by-five layer stacked five layers high (i.e., 125 cartons total), then the user would want to ensure that all 125 RFID tags are read, even those tags mounted to cartons located in the center of the stack. This effectiveness of this operation may be aggravated by the presence of material that is not conducive to RF reading.

More specifically, radio waves are able to travel through most non-metallic materials, so that RFID tags can be embedded in packaging or encased in protective plastic for weather-proofing and durability while still being readable. However, radio waves reflect off metal and are absorbed by water and complex organic molecules such as fat at higher frequencies. These characteristics make tracking metal products or those with high water content problematic. In addition, reading a stack of cartons with RFID tags, particularly cartons located in the center of the stack or cartons that may contain metals or liquids, is also problematic.

In view of the foregoing, there is a need in the art for RFID technology that enables all of the RFID tags in a stack of cartons to be read. The present invention satisfies this need.

BRIEF SUMMARY OF THE INVENTION

The present invention relates to radio-frequency identification (RFID) systems, including tags, RFID-enabled objects, and readers. The invention also relates to RFID apparatus and methodology that enables layers of objects, such as stacked on a pallet or packed in a box, to be read—even the innermost object in the stack and even in the presence of RF intolerant material such as liquids and metals.

According to one of the embodiments and by way of example only, a RFID tag may include a pair of antennas and an RFID circuit. The antennas receive activation energy from a reader, and the RFID circuit modulates tag energy when activation energy is received by at least one of the antennas. The tag may also include a transmission line for operatively coupling the RFID circuit to the antennas. A first one of the antennas may receive activation energy which, in turn, may be radiated by a second one of the antennas. The second antenna may also receive tag energy radiated by an antenna of another RFID tag. The received tag energy may then be radiated by the first antenna. Accordingly, when a plurality of the RFID tags are positioned in sequence in operative proximity with each other, activation energy may be propagated through the sequence from one RFID tag to another in one direction, and tag energy may be propagated through the sequence from one RFID tag to anther in another direction.

One of the advantages of the RFID tag is that when a plurality of tags are mounted to a plurality of objects, the now RFID-enabled objects can be read in batch, including the innermost objects in a stack and objects that may be blocked by an RF obstacle. More specifically, the RFID tags are oriented on the objects so that when the objects are stacked together, the RFID tags are sequentially positioned in operative proximity with each other. Therefore, energy from a reader that is received by, e.g., an uppermost tag is propagated through the sequence tag by tag in one direction. In addition, tag energy modulated by the RFID circuit of each of the tags is propagated through the sequence tag by tag in the other direction. This two-dimensional propagation enables the RFID circuit of each tag of the RFID-enabled objects in the stack to be excited and to be read by the reader.

In other embodiments, the RFID tag may include a substrate on which the antennas, the RFID circuit, and the transmission line are disposed. The substrate may include an adhesive layer that enables the tag to be adhered to objects or other objects. The substrate may be dimensioned so that when mounted to an object, the antennas are disposed at or near opposing edges of the object. This positioning of the antennas minimizes the distance between adjacent antennas in a sequence of tags in a stack of objects, thereby enhancing the operative proximity of the tags.

Other features and advantages of the present invention will become apparent to those skilled in the art from a consideration of the following detailed description taken in conjunction with the accompanying drawings.

BRIEF DESCRIPTION OF THE SEVERAL VIEWS OF THE DRAWINGS

FIG. 8 is a plan view of a RFID tag according to a number of embodiments;

FIG. 10 is a plan view of a RFID tag according to other embodiments;

FIG. 11 is a plan view of a RFID tag according to still other embodiments;

DETAILED DESCRIPTION OF THE INVENTION

Figure 1:
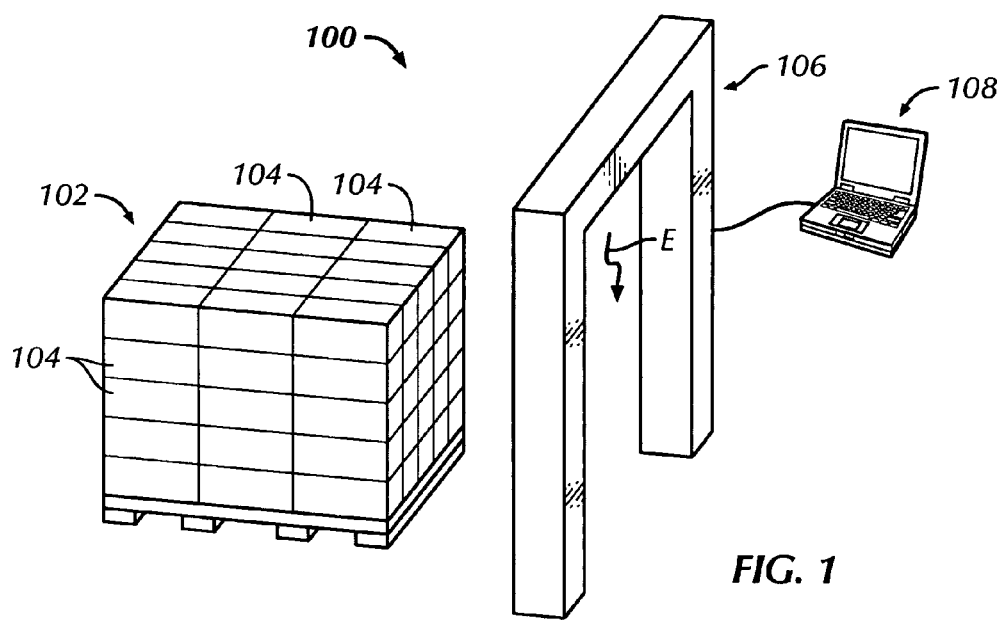
FIG. 1 is a perspective view of an embodiment of a system for reading a load of stacked RFID-enabled objects.
Figure 2:
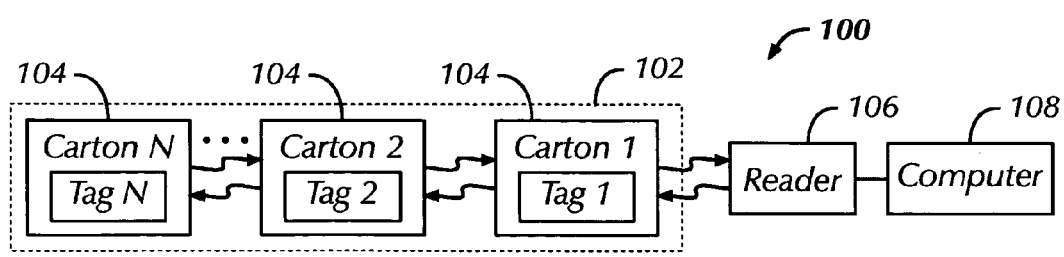
FIG. 2 schematically illustrates a system for reading a load of stacked RFID-enabled objects.

Referring more particularly to FIGS. 1 and 2 of the drawings, a radio-frequency identification (RFID) system 100 increases the read performance of a load 102 that includes a plurality of RFID-enabled objects 104. In a number of embodiments, the system 100 may include a reader or interrogator 106 and a computer 108. The reader 106 transmits and receives energy in the form of radio waves to and from the load 102, and passes information associated with the load 102 and carried by the received energy to the computer 108. The computer 108 in turn may be connected to, for example, a network, an output device, and/or a database for further processing of the information.

Figure 3:
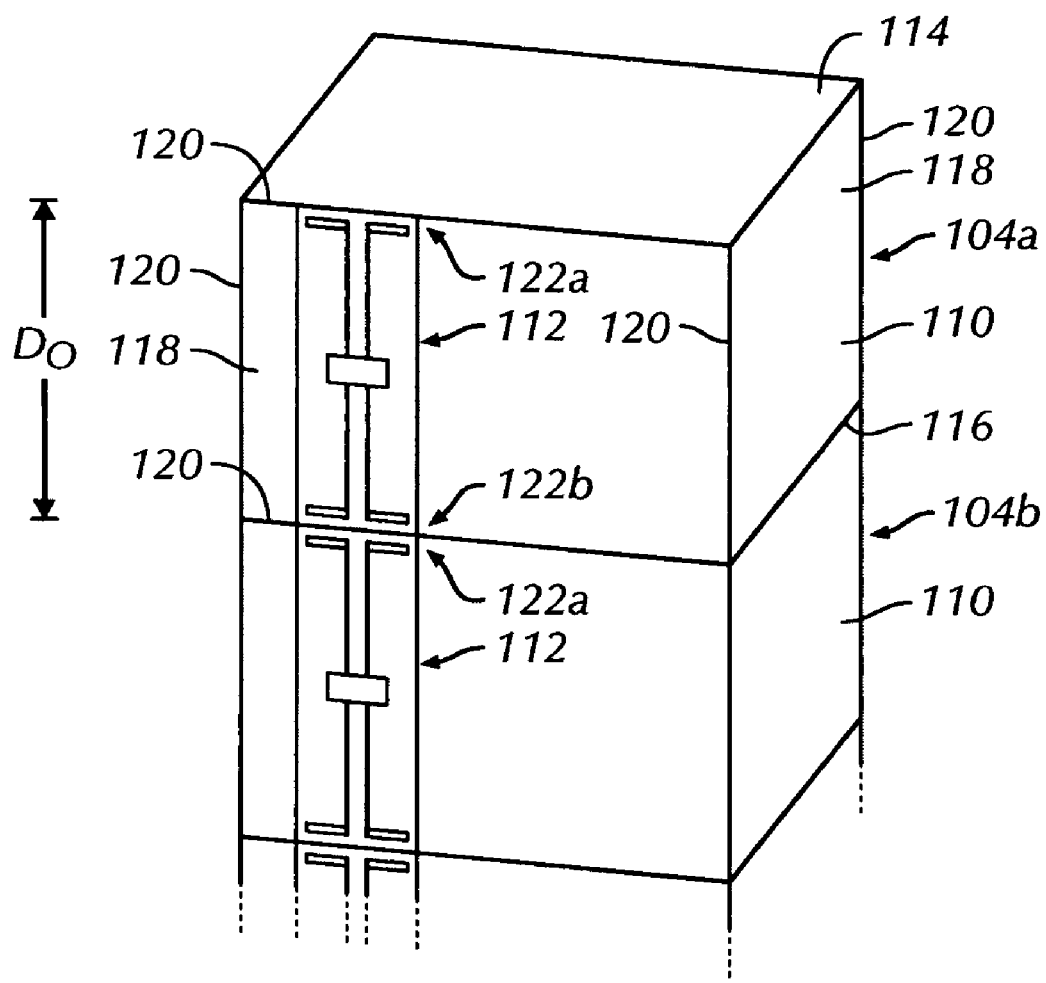
FIG. 3 is a perspective view of a stack of RFID-enabled objects.

With additional reference to FIG. 3, in a number of embodiments, an RFID-enabled object 104 may include an object 110 and an RFID tag 112. For purposes of this description, the object 110 may be defined as having a top 114, a bottom 116, and four sides 118 each having four edges 120. With additional reference to FIG. 4, in many of the embodiments, an RFID tag 112 may include a pair of antennas 122, including a first antenna 122a and a second antenna 122b, and an RFID circuit 124 electrically coupled between the antennas 122 by a transmission line 126. The RFID circuit 124 may including any number of components, including a chip, a substrate, conductive pads or leads, straps, an amplifier, a switch, a transponder, and so on, and will be discussed in more detail below.

Figure 5:
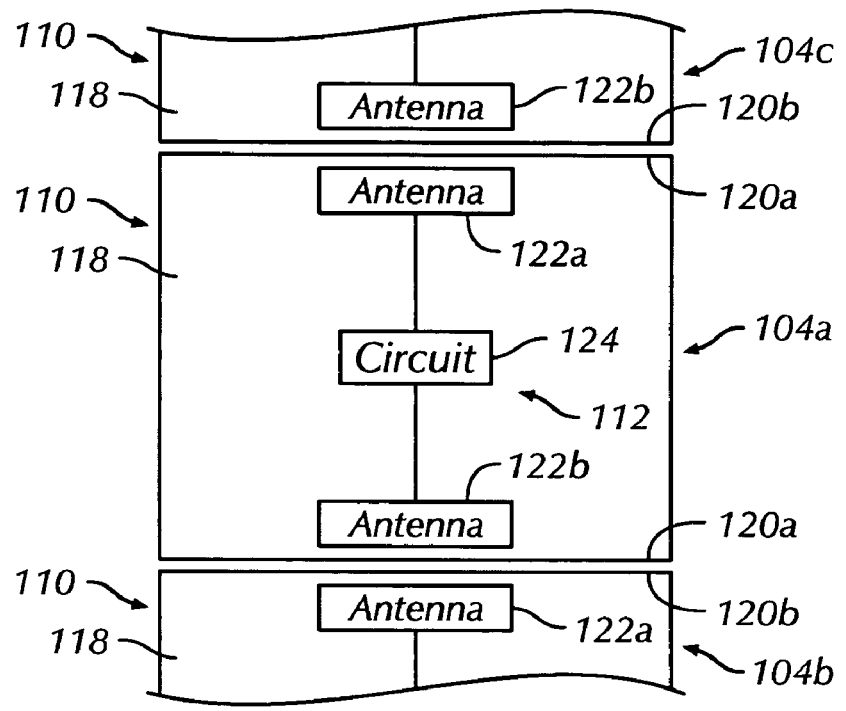
FIG. 5 illustrates an RFID tag disposed on an object.

With additional reference to FIG. 5, an RFID tag 112 may be disposed an object 110 to yield a first one of the RFID-enabled objects 104a. In some of the embodiments, a tag 112 may be disposed on one of the sides 118 of the object 110 such that one of the antennas 122 (e.g., the first antenna 122a) is positioned or disposed at or near one of the edges 120 (e.g., a first edge 120a) of the side 118, and such that the other antenna 122 (e.g., the second antenna 122b) is positioned or disposed at or near another one of the edges 120 (e.g., a second edge 120b) of one of the side 118.

In many embodiments, edges 120a and 120b may be opposing edges of the side 118 as shown, such as a top edge and a bottom edge or, alternatively, a left edge and a right edge. Accordingly, for the purposes of this description, the first antenna 122a may be described as a top antenna, and the second antenna 122b may be described as a bottom antenna. However, those skilled in the art will appreciate that the principles of the invention are not defined by or limited to descriptive terms such as top, bottom, up, down, left, right, etc. In addition, for the purposes of this description, the term stack and its derivatives refer to both a vertical stack of objects 104 (i.e., one object positioned on top of another object) and a horizontal stack of objects 104 (i.e., side-by-side or adjacent positioning of objects in a layer). Further for the purposes of this description the term load (referenced by numeral 102) may encompass any number of forms, for example, a stack of cartons on a pallet or layers of objects packed in a box or carton (e.g., pharmaceutical bottles packed in a box). Still further for the purposes of this description, the term object (referenced by numeral 104) may encompass any number of forms, for example, a box, a carton, a bottle, a container, or any other item within the enablement of the system 100.

With continued reference to FIG. 5, the object 110 of the RFID-enabled object 104a is stackable with at least one other similarly configured RFID-enabled object 104b, 104c. As such, when two or more objects 104 are stacked together, the first or top antenna 122a of RFID-enabled object 104a may be positionable within communicative or operative proximity with the second or bottom antenna 122b (e.g., within the near-field region of the antenna) of another one of the RFID-enabled objects, e.g., object 104c. Similarly, the second or bottom antenna 122b of RFID-enabled object 104a may be positionable within communicative or operative proximity with the first or top antenna 122a of still another one of the RFID-enabled objects, e.g., object 104b.

Figure 4:
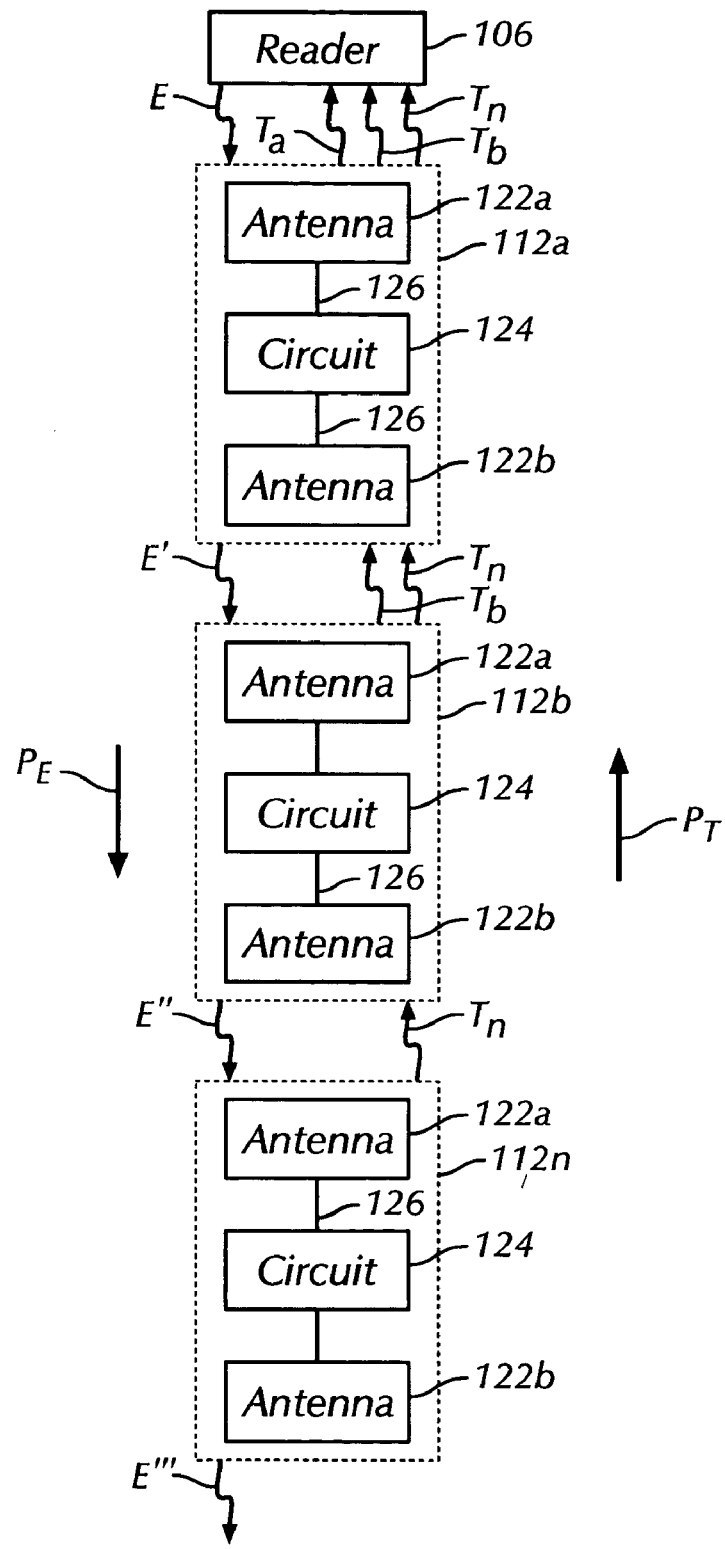
FIG. 4 illustrates energy modulation and propagation through a series of RFID tags.

By positioning or stacking a plurality of RFID-enabled objects as shown in FIG. 5, the corresponding plurality of RFID tags 112 are arranged in sequence, for example, in a substantially linear propagation array as represented by RFID tags 112a, 112b, . . . , 112n in FIG. 4. The following example with reference to FIG. 4 will assume that the load 102 is made up of a vertical stack of objects 104 being read by a reader 106 positioned above the load, such that the descriptive terms "top" and "bottom" facilitate the description of the principles of the invention. Accordingly, when in the coverage area or reader field of the reader 106, activation energy from a reader 106 (indicated by arrow E) is received by the top antenna 122a and excites the RFID circuit 124 of the top RFID tag 112a. The RFID circuit 124 in turn causes tag energy associated with RFID tag 112a to be modulated and radiated from the top antenna 122a back to the reader 106, which energy is indicated by arrow $T_a$.

In addition, the activation energy E from the reader 106 may also propagate through the transmission line 126 to the bottom antenna 122b for radiation, which energy is indicated by arrow E'. Energy E' radiated by RFID tag 112a may then be received by the top antenna 122a of an adjacent RFID tag 112b, which received energy excites the RFID circuit 124 of tag 112b. The RFID circuit 124 in turn causes tag energy associated with the subsequent RFID tag 112b to be modulated and radiated from the top antenna 122a back to the bottom antenna 122b of the top RFID tag 122a, which energy is indicated by arrow $T_b$. Energy $T_b$ propagates through the top RFID tag 112a and is radiated by the top antenna 122a to the reader 106.

The activation energy E' received by the second RFID tag 112b also propagates through the transmission line 126 to the bottom antenna 122b for radiation, which energy is indicated by arrow E". Energy E" radiated by RFID tag 112b may then be received by the top antenna 122a of an adjacent RFID tag 112n, which received energy excites the RFID circuit 124 of tag 112n. The RFID circuit 124 in turn causes tag energy associated with RFID tag 112 to be modulated and radiated from the top antenna 122a back to the bottom antenna 122b of the intermediate RFID tag 122b, which energy is indicated by arrow $T_n$. Energy $T_n$ propagates through and is radiated from top antenna 122a of the intermediate tag 112b. Energy $T_n$ is received by and radiated from the top tag 112a for reception by the reader 106.

Accordingly, when a plurality of the RFID tags 112a, 112b, . . . , 112n are positioned in sequence in operative proximity with each other, activation energy E is propagated through the sequence from one RFID tag 112 to another in one direction, and tag energy T is propagated through the sequence from one RFID tag 112 to another in another, i.e., opposite, direction.

As an alternative description of the operation illustrated in FIG. 4, a plurality of RFID-enabled objects 104 stacked with each other define an axis of propagation represented by arrow $P_E$ of energy E from the reader 106 along a series of sequential RFID tags 112, and an axis of propagation represented by arrow $P_T$ of energy T from the RFID tags 112 back to the reader 106. This ability to cause energy from a reader 106 to be propagated sequentially from one object 104 to another enables the system 100 to read each of the objects 104 in the load 102, even in the presence of non-RF conductive material.

Figure 6:
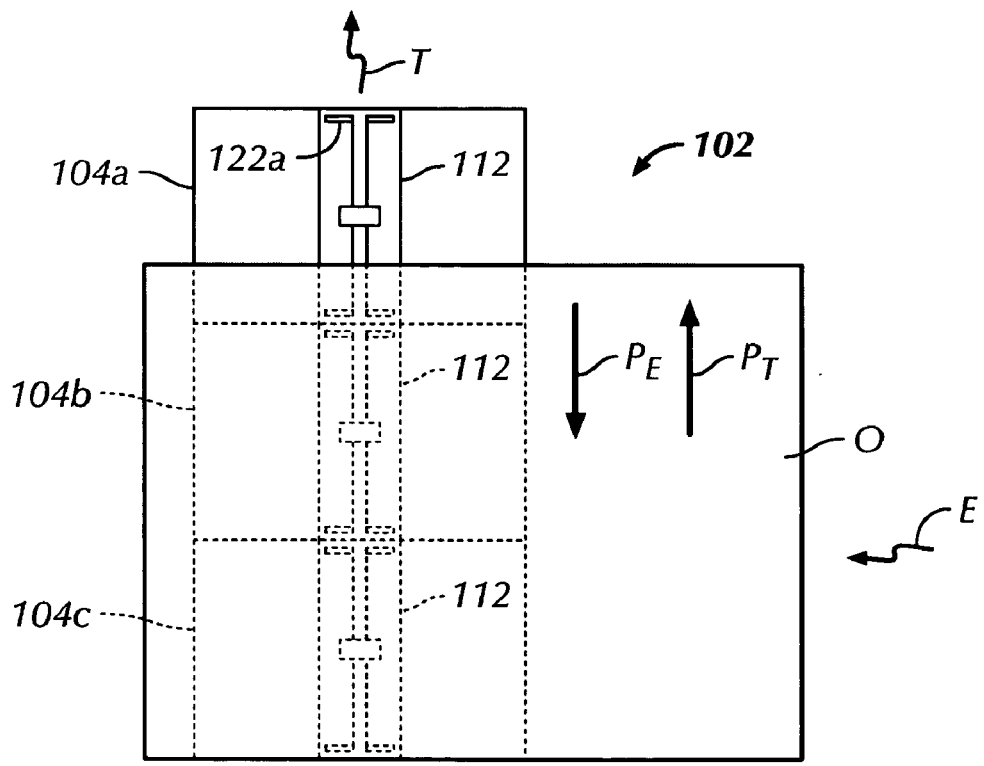
FIG. 6 illustrates a load of stacked RFID-enabled objects partially blocked by an RF obstruction.

For example, an obstacle O including material that is adverse to RF energy, such as metal or water, is illustrated in FIG. 6 as blocking a portion of the load 102 from energy E from a reader. Accordingly, the energy E cannot be received directly by the RFID tags 112 of the obscured objects 104b and 104c. However, the top antenna 122a of the tag 112 of the uppermost RFID-enabled object 104a is able to receive the energy E and propagate the received energy through the tags 112 of the lower RFID-enabled objects 104b and 104c as indicated by arrow $P_E$. Further, the modulated energy from the tags 112 of each of the lower objects 104b and 104c is propagated upward as indicated by arrow $P_T$ and radiated by the top antenna 122a of the tag 112 of the readable object 104a that has an unobscured line-of-sight of the reader, as indicated by arrow T.

Accordingly, depending on the physical location of a tag 112 in the presence of objects or obstacles, an antenna 122 may have either a line of sight to a reader 108 or no line of sight to the reader. A line of sight may be defined as a propagation path between the reader 108 and antenna 122 where the attenuation of the energy is not substantially greater than that of an equal path with non-intervening materials or structures. No line of sight may be defined as a propagation path where attenuation is sufficiently great that reading of the energy E by a tag 112 is severely impeded or not possible.

Figure 7:
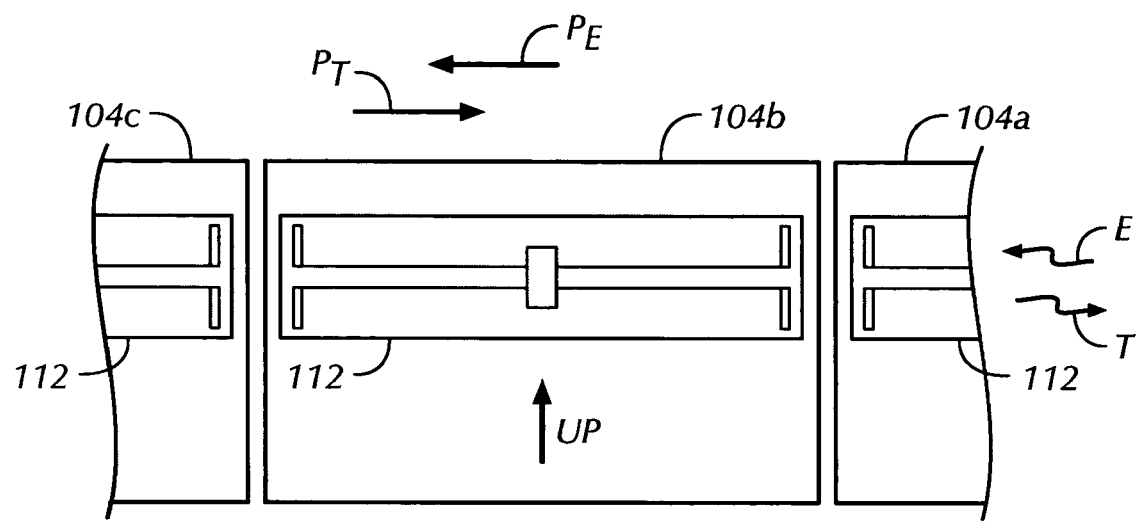
FIG. 7 illustrates an embodiment in which energy is propagated horizontally though a series of RFID-enabled objects.

In alternative embodiments as represented in FIG. 7, the RFID-enabled objects 104 may also propagate the energy E in a substantially traverse or horizontal (i.e., parallel to the ground) line of propagation $P_E$, and in response propagate the energy T modulated by the tags 112 in a horizontal line of propagation $P_T$, in contrast to the substantially vertical (i.e., normal to the ground) lines of propagation $P_E$ and $P_T$ shown in the example of FIG. 6.

Referencing FIGS. 4 and 6, in a number of embodiments the antennas 122 may be configured to optimize efficiency in a particular operation. For example, the first antenna 122a may be configured as a long-range or free-space antenna that is specifically designed to transceiver energy E with a reader at a distance. However, as the second antenna 122b may be positioned in physical proximity with the first antenna 122a of an adjacent object 104, then the second antenna 122b may be configured for optimization in the near field. In addition, in many embodiments the second antenna 122b may be configured as a radiating antenna.

In alternative embodiments the second antenna 122b may be configured as a proximity coupler to generate a strong electric or magnetic field for activating a proximate first antenna 122a of an adjacent object 104. For example, the second antenna 122b may include capacitive plates for generating a large electric field, or may include a loop of wire for generating a large magnetic field. Accordingly, tag energy T may be modulated from one RFID tag 112 to another through proximity coupling.

Accordingly, in many embodiments the first antenna 122a may include a free-space antenna, and the second antenna 122b may include a proximity coupler. In these embodiments, the free-space antenna 122a may be optimized for proximity coupling when positioned or sandwiched between adjacent objects 104. That is, the free-space antenna 122a may be configured to operate in two modes: a free-space mode and a proximity-coupler mode, with the loading of the objects 104 triggering a switch from free-space mode to proximity-coupler mode. Accordingly, the antennas 122 may be defined as structures that are capable of receiving and/or transmitting RF energy over a range greater than one wavelength at an operating frequency. In addition, in other embodiments, the antennas 122 may be defined as structures that are capable of coupling in the near field, such as less than one wavelength at an operating frequency.

In some of the embodiments, the antennas 122 and the RFID circuit 124 may be disposed directly on the surface of object 110 or embedded in the wall of the object 110. Examples of objects in which antennas are disposed directly in the wall of objects, with chips coupled to the antennas, are disclosed in U.S. Pat. No. 6,667,092 assigned to International Paper (namely, a capacitive antenna having two pads separated by a gap embedded in packaging linerboard, with an interposer including an RF processor coupled between the antenna pads), which is incorporated herein by reference in its entirety. Examples of objects or packages in which antennas are disposed directly on the surface of the package and coupled to chips are disclosed in U.S. Pat. No. 6,107,920 assigned to Motorola (FIGS. 14 and 15 of which show a package blank with directly formed antenna, and an RF identification circuit chip antenna secured to the package surface) and in U.S. Pat. No. 6,259,369 assigned to Moore North America (in which antenna sections are printed in conductive ink on a package, with a label containing an RFID bridging the antenna sections), both of which patents are incorporated herein by reference in their entirety.

Figure 9:
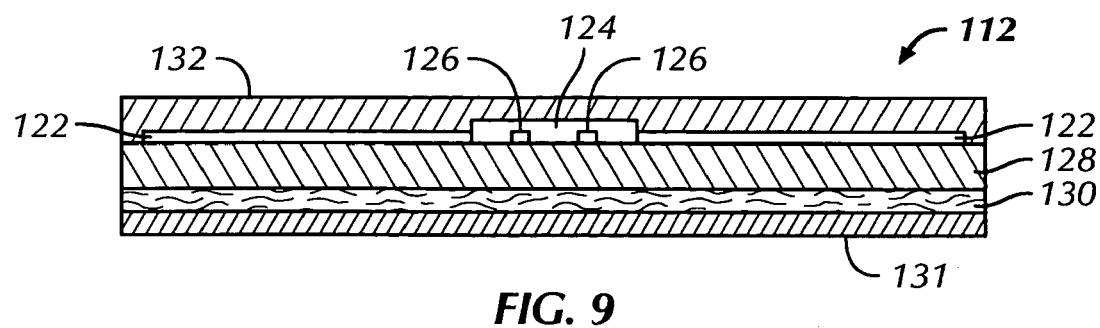
FIG. 9 is a cross-sectional view taken along line 9-9 of FIG. 8.

In other embodiments, such as shown in FIGS. 8 and 9, the RFID tag 112 may include a substrate 128 on which the antennas 122, the RFID circuit 124, and the transmission line 126 are disposed. In a number of embodiments, the substrate 128 may be defined as having at least one set of opposing edges 129, such as a first or top edge 129a and a second or bottom edge 129b. In addition, the substrate 128 may be defined as having a propagation dimension $D_P$ defined between the opposing edges 129.

As shown by the example in FIG. 8, in some of the embodiments, the antennas 122 may be disposed at or near to a respective one of the edges 129. In other embodiments, such as shown in FIG. 3, the propagation dimension $D_P$ of the substrate 128 may be substantially equal to an object dimension $D_O$ defined between opposing edges 120 of the side 118 of the object 110 (i.e., the height of the object 110 in the example shown). Accordingly, in many of the embodiments, the antennas 122 are located at or near (or as close as possible to) the opposing edges 120 of the side 118 of the object 110, respectively. Therefore, when objects 110 are stacked, the distance between the bottom antenna 122b of an upper RFID-enabled object 104a and the top antenna 122a of a lower RFID-enabled object 104b is minimized. Accordingly, the strength of the field radiated by the antennas 122 is maximized when received by a coupled antenna 122.

In still other embodiments, such as shown in FIG. 9, the RFID tag 112 may include an adhesive layer 129 coated on a back side of the substrate 128 so that the tag 112 is adherent to an object 110. A backing sheet 131 may be provided over the adhesive layer 130 for removal prior to applying the tag 112 to an object 110. In still other embodiments, the RFID tag 112 may include a protective coating or layer 132 over the antennas 122, the RFID circuit 124, and the transmission lines 126 on a front side of the substrate 128.

Referencing FIG. 8, each of the antennas 122 may be configured as an elementary radiator, such as a dipole antenna including a pair of radiating elements 134. Depending upon the embodiment, each pair of radiating elements 134 may be disposed substantially parallel to either an edge 120 of an object 110 as shown in FIG. 3 or an edge 129 of a substrate 128 as shown in FIG. 8. In dipole embodiments, the transmission line 126 may include a pair of conductors respectively connected to the radiating elements 134.

In other embodiments, each of the antennas 122 may include a notch radiator 136 as illustrated in FIG. 10. In still other embodiments, such as shown in FIG. 11, each of the antennas 122 may be configured as a directive antenna such as a Yagi antenna including a driven element 138, a reflector element 140, and one or more director elements 142.

Figure 12:
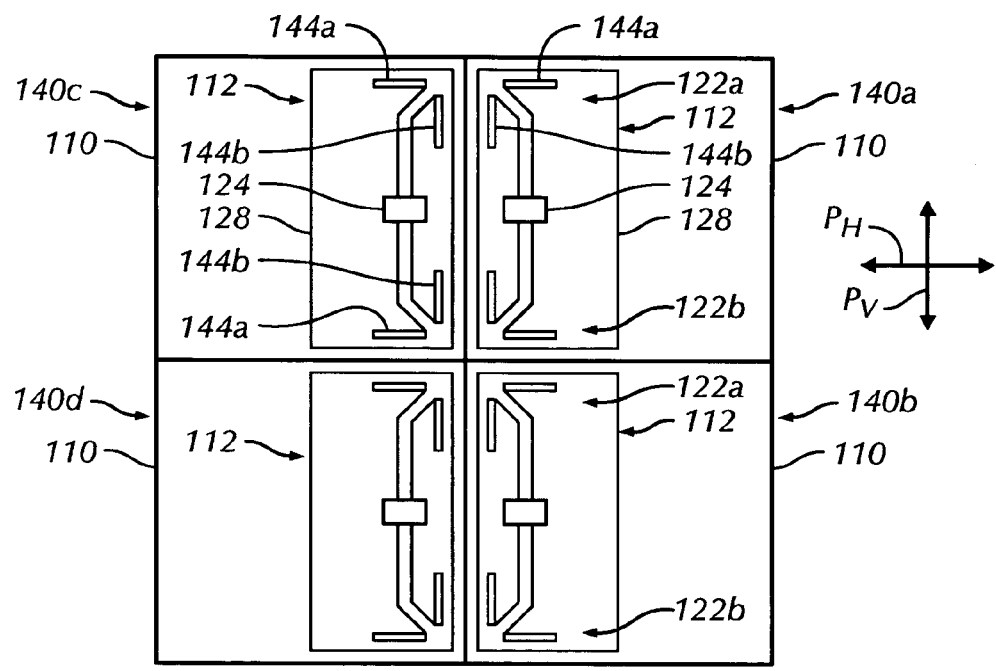
FIG. 12 illustrates a stack of RFID-enabled objects in which energy is propagated in two dimensions.

In addition to receiving and radiating energy substantially along a single axis of propagation, the RFID tag 112 may be configured to receive and radiate energy along two substantially orthogonal axes of propagation $P_V$ and $P_H$ as shown in FIG. 12. In these embodiments, each of the antennas 122 may include a bi-directional antenna, such as a pair of orthogonally disposed radiating elements 144. A first or horizontal radiating element 144a may be disposed horizontally along a top or a bottom edge 120 of an object 110 (or substrate 128), and a second or side radiating element 144b may be disposed vertically along a side edge 120 of an object 110 (or substrate 128) at or near the intersection with a respective top or bottom edge 120 of the object 110. Accordingly, the horizontal radiating elements 144a may receive and radiate energy along a vertical axis of propagation $P_V$, and the vertical radiating elements 144b may receive and radiate energy along a horizontal axis of propagation $P_H$.

Figure 13:
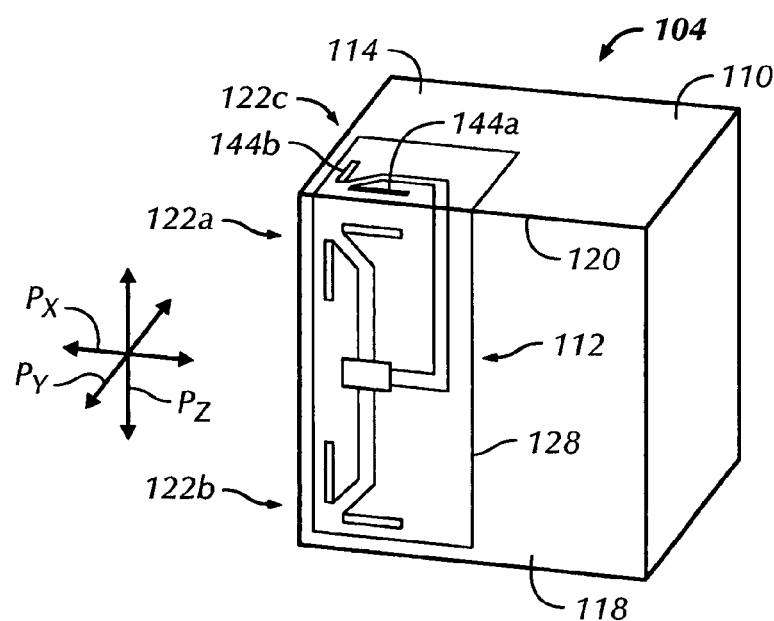
FIG. 13 illustrates an RFID-enabled object in which energy is propagated in three dimensions.

In still other embodiments, the RFID tag 112 may be configured to receive and radiate energy along three substantially orthogonal axes of propagation $P_x$, $P_y$ and $P_z$ as shown in FIG. 13. In these embodiments, the tag 112 may include three antennas 122, with each antenna including a pair of orthogonally disposed radiating elements 144. The first and second antennas 122a and 122b may be disposed on a side 118 of an object as described above. A third antenna 122c may be disposed on an adjacent side 118, or on the top 114 (as shown) or on the bottom 116 of the object 110. Accordingly, a first radiating element 144a of the third antenna 122c may receive and radiate energy along a third axis of propagation $P_z$ that is orthogonal to the other two axes $P_x$ and $P_y$.

In a number of embodiments, each of the antennas 122 may be disposed on a single substrate 128 that is folded about an edge 120 of the object 110 so that at least one of the antennas 122 (e.g., antenna 122c) is disposed on as side that is orthogonal to the side on which the other two antennas 122 (e.g., antenna 122a and 122b) are disposed.

In many applications of the RFID tag 112, the size of the object 110 may not be known, or it may be desirable to enable a user to utilize the tags 112 on objects 110 of varying sizes. Accordingly and with reference to FIG. 14, in a number of embodiments, the RFID tag 112 may include a pair of antenna sections 146a and 146b and an RFID circuit section 148. Each of the antenna sections 146 may include an antenna 122 disposed at or near a first edge 129a of a substrate 128 and a transmission line segment 126 extending from the antenna 122 to an opposition edge 129b of the substrate 128. The RFID circuit section 148 may include an RFID circuit 124 disposed on a substrate 128 and a pair of transmission line segments 126$c_1$ and 126$c_2$ extending from the RFID circuit 124 to a respective opposing edge 150$a$ and 150$b$ of the substrate 128. As shown in FIG. 15, each section 146 and 148 may include an adhesive layer 130 with a backing sheet 131 on a back side of the substrate 128 and a protective layer 132 on a front side of the substrate 128 coving the tag components.

Figure 14:
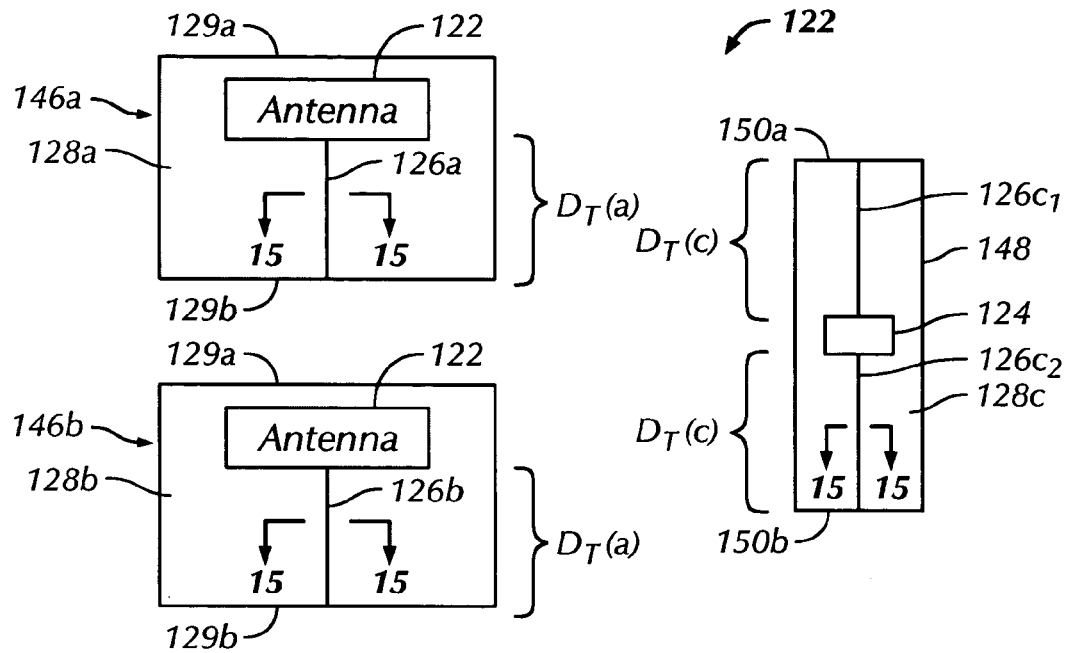
FIG. 14 is a plan view of a sectional RFID tag according to a number of embodiments.
Figure 15:
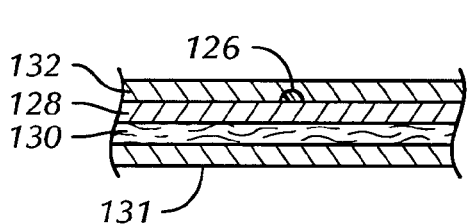
FIG. 15 is a cross-sectional view taken along lines 15-15 of FIG. 14.

With continued reference to FIG. 14, each of the antenna sections 146 may be defined as having a tolerance dimension $D_T(a)$ extending between the antenna 122 and the edge 129$b$ of the substrate 128 to which the transmission line segment 126 extends. In addition, the circuit section 148 may be defined as having a pair of tolerance dimensions $D_T(c)$ respectively extending between the RFID circuit 124 and the opposing edges 150. The tolerance dimensions $D_T$ of the sections 146 and 148 will be discussed in more detail below.

Figure 16A:
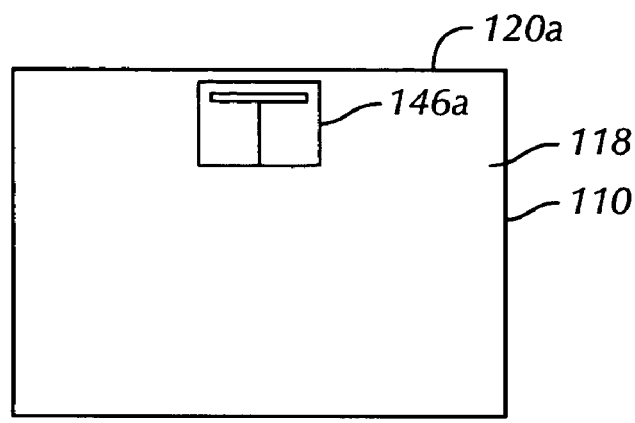
FIGS. 16A, 16B, and 16C illustrate methodology for RFID enabling an object utilizing a sectional RFID tag.
Figure 16B:
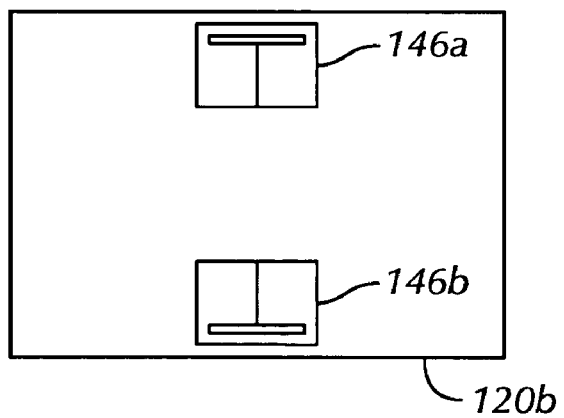
Figure 16C:
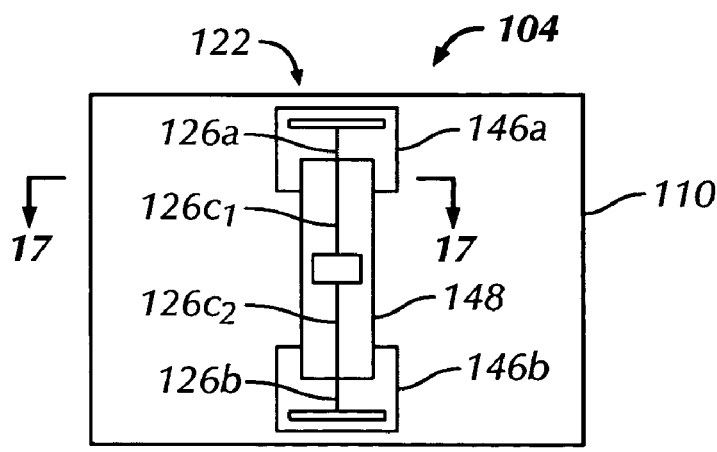
Figure 20:
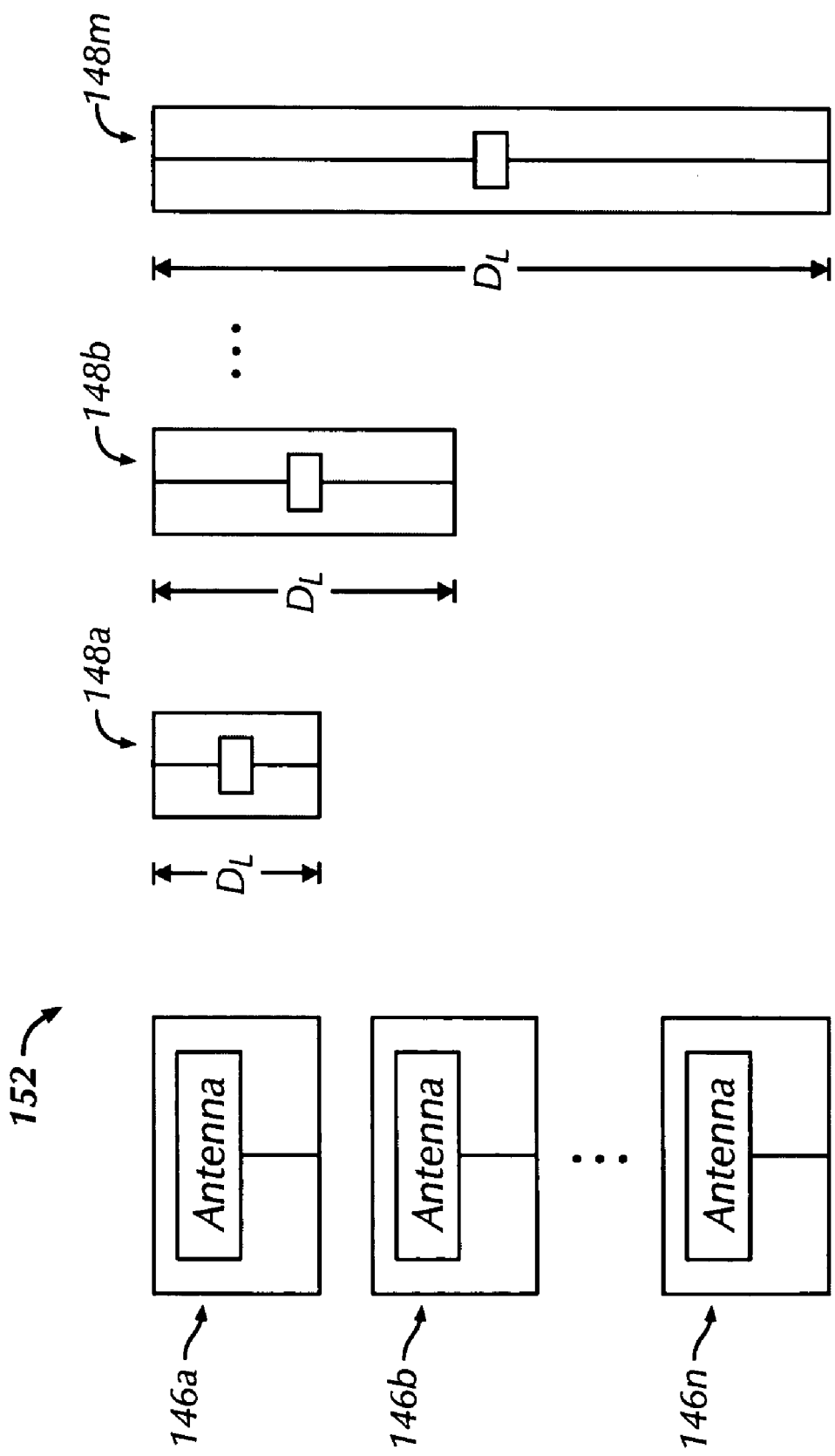
FIG. 20 is a plan view of a tag packet for RF enabling objects of varying size.

To utilize the sectional tag 122 illustrated in FIG. 14 to RFID enable an object 110, one of the antenna sections 146$a$ may be applied (e.g., adhered) to the side 118 of an object 110 so that the antenna 122 is positioned at or near an edge 120$a$ of the side 118 as shown in FIG. 16A. The other antenna section 146$b$ may applied (e.g., adhered) to the side 118 of the object 110 so that the antenna 122 is positioned at or near an opposing edge 120$b$ of the side 118 and so that the sections 146 are substantially aligned as shown in FIG. 16B. The circuit section 148 may then be applied to the side 118 of the object 110 by overlapping and bridging the two antenna sections 146 and substantially aligning the transmission line segments 126$c_1$ and 126$c_2$ with the transmission line segments 126$a$ and 126$b$ of the antenna sections 146$a$ and 146$b$, respectively, as shown in FIG. 16C. When the RFID circuit section 148 is applied, a RFID tag 122 and, accordingly, an RFID-enabled object 104 are completed.

Figure 17:
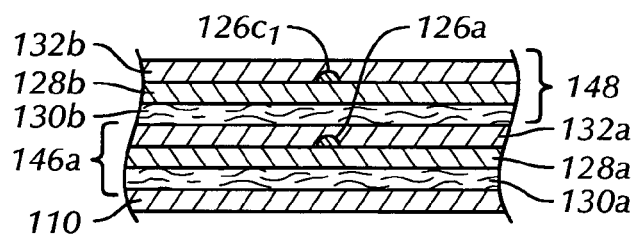
FIG. 17 is a cross-sectional view taken along line 17-17 of FIG. 16C.

As illustrated in FIG. 17, when the RFID circuit section 148 is applied, the transmission lines 126$c$ respectively align with an overlap the transmission line segments 126$a$ and 126$b$ of the antenna sections 146, respectively (e.g., segment 126$c_1$ with segment 126$a$ and segment 126$c_2$ with segment 126$b$). Accordingly, because of their operative proximity, the transmission line is defined by the segments 126 being coupled together through capacitance.

Figure 18:
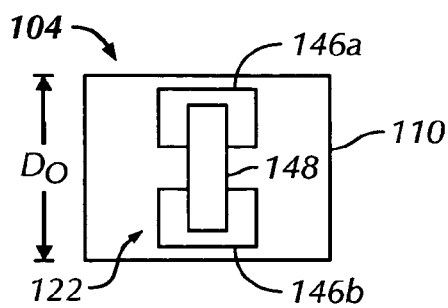
FIG. 18 illustrates a sectional tag applied to an object having a relatively small dimension.
Figure 19:
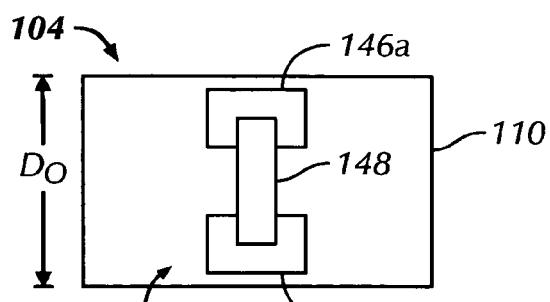
FIG. 19 illustrates a sectional tag applied to an object having a relatively large dimension.

Referring to FIGS. 18 and 19, because of the tolerance dimensions $D_T$ of the sections 146 and 148, objects 110 having varying object dimensions $D_O$ may be RFID enabled by the tag 122. As shown in FIG. 18, the object dimension $D_O$ is relatively small so that when the tag 122 is applied, there is a relatively large amount of overlap of the RFID circuit section 128 with the antenna sections 146. However, as shown in FIG. 19, the object dimension $D_O$ is relatively large so that when the tag 122 is applied, there is a relatively small amount of overlap of the RFID circuit section 128 with the antenna sections 146. In either case, the transmission line segments 126 overlap and align to ensure coupling through capacitance.

To increase the applicability to varying size objects, a tag packet 152 may include a plurality of substantially identical antenna sections 146$a$, 146$b$, ..., 146$n$ and a plurality of chip sections 148$a$, 148$b$, ..., 148$m$ each having a different length $D_L$. Accordingly, a user may apply the a pair of antenna sections 146 to an object and then, depending on the object dimension $D_O$, may select the RFID circuit section 148 that best bridges the applied antenna sections 146.

Figure 21:
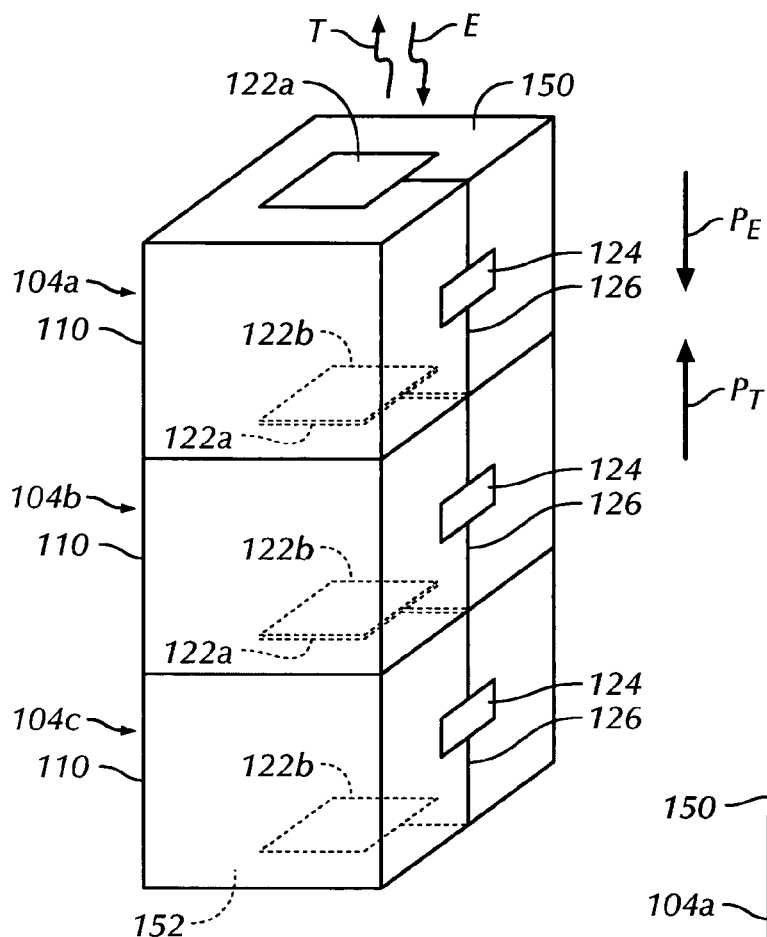
FIG. 21 is a perspective view of a stack of RFID-enabled objects according to other embodiments.
Figure 22:
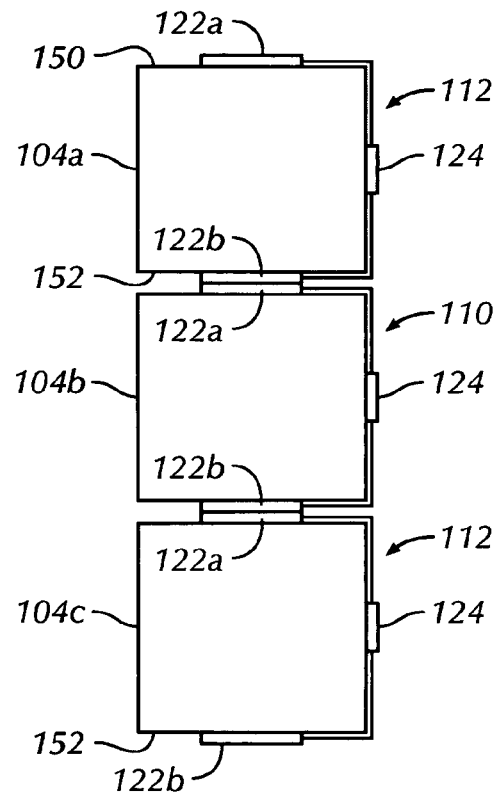
FIG. 22 is a side view illustrating the stack of objects of FIG. 21.

In addition to disposing or mounting an RFID tag 112 to a single side of an object 110 as shown, e.g., in FIG. 3, or to a pair of adjacent sides of an object 110 as shown in FIG. 13, in a number of embodiments an RFID tag 112 may be mounted across three sides of an object 110. More specifically, as shown in FIGS. 21 and 22, the first antenna 122$a$ may be disposed on a first side 150 of an object 110, and the second antenna 122$b$ may be disposed on a opposing side 152 that is non-orthogonal with or substantially parallel to the first side 150 of the object 110. For example, the first and second sides 150 and 152 may be the top and the bottom of the object 110, or opposing sides. The RFID circuit 124 may then be disposed at any other location on the object 110, e.g., on a side of the object 110 that is adjacent to or positioned between the first and second sides 150 and 152, and connected to the antenna 122 by the transmission line 126.

In these embodiments, when a plurality of RFID-enabled objects 104 are stacked, the second antenna 122$b$ is in operative proximity of the first antenna 122$a$ of an adjacent object 104. According, energy E from a reader 106 is transmittable from RFID-enabled object 104 to object 104 along an axis of propagation $P_E$, and modulated energy T from the tags 112 is transmittable along an axis of propagation $P_T$. In FIG. 22 the thickness of the antennas 122 is exaggerated for the sake of clarity. In commercial embodiments, the antenna 122 may be substantially thin so that respective adjacent sides 150 and 152 of the objects 110 may be substantially flush with each other when stacked, as shown in FIG. 21.

Figure 23A:
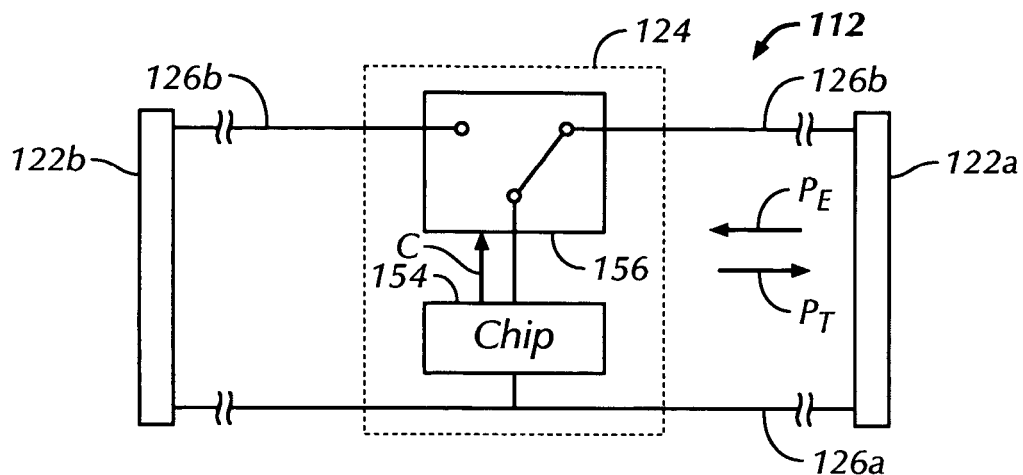
FIGS. 23A and 23B schematically illustrate an RFID circuit according to a number of embodiments.
Figure 23B:
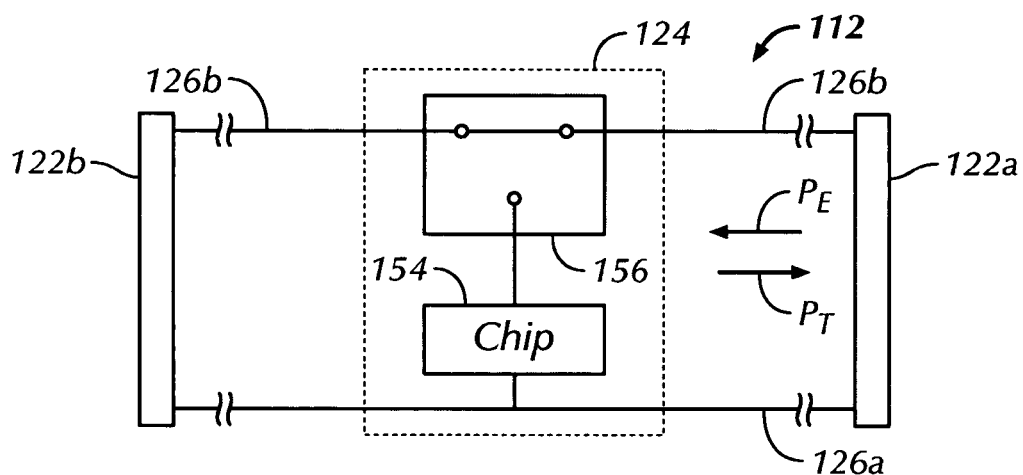

A number of embodiments of the RFID circuit 124 are illustrated in FIGS. 23A and 23B. In these embodiments, the transmission line may include a pair of conductors 126$a$ and 126$b$ (see also, e.g., FIG. 8), and the RFID circuit 124 may include an RFID chip 154 connected to the first conductor 126$a$ and a bypass switch 156 connected between the chip 154 and the second conductor 126$b$. In operation, the switch 156 may couple the chip 154 to the first antenna 122$a$ receiving the energy E from a reader 108 (along $P_E$) as shown in FIG. 23A. In this coupled mode, the chip 154 is able to communicate with the reader 108 (along $P_T$), and the energy E does not pass through to the second antenna 122$b$. When it is confirmed that the RFID tag 112 has been read, then the chip 154 may send a control signal C to cause the switch 154 to decouple the chip 154 from the first antenna 122$a$ and to connect the first and second antennas 122$a$ and 122$b$ together, as shown in FIG. 23B. In this decoupled or pass-though mode, energy E from the reader 108 and energy T from the tags 112 downstream pass through the tag 112 along axes $P_E$ and $P_T$.

Figure 24:
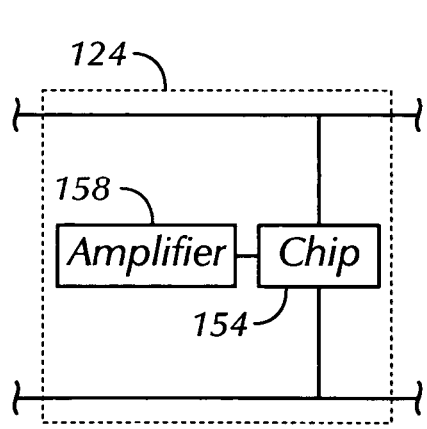
FIG. 24 schematically illustrates an RFID circuit according to other embodiments.
Figure 25:
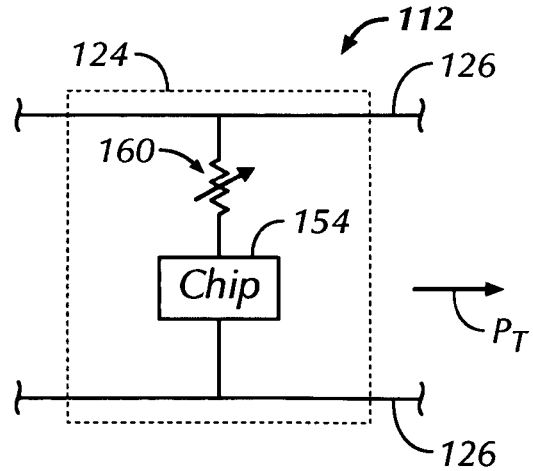
FIG. 25 schematically illustrates an RFID circuit according to still other embodiments.

In other embodiments, such as shown in FIG. 24, the circuit 124 may include an amplifier 158 connected to the chip 154 for amplifying the reader energy E (and tag energy T) transmitted to an adjacent tag 112. In some of the embodiments, the amplifier 158 may store energy in the form of a voltage on a capacitor. In other embodiments, the amplifier 158 may be included in the switch 156 so that when in pass-though mode (as shown in FIG. 23B), the energy E may be amplified. In still other embodiments, the amplifier 158 may include a transistor amplifier for utilizing stored energy to amplify the energy signal. The amplifier 158 may be either internally or externally powered.

In still other embodiments, the chip 154 may be configured with a variable input impedance, which is indicated by reference numeral 160. For example, the chip 154 may have three impedance states: a first state in which the chip 154 absorbs energy E from the transmission line 126; a second state in which energy E is reflected back toward the reader 108 along axis $P_T$, thereby achieving backscatter modulation and communicating information from the chip 154 to the reader; and a third state in which the amount of energy E absorbed by the chip 154 is minimized, thereby maximizing the amount of energy E passed on to the next tag downstream. In other embodiments of the third state, the impedance may be changed to a negative impedance, and by using energy stored on the chip 154 (e.g., with a capacitor), the negative impedance may amplify the energy E passing through the tag 112.

In other embodiments it may be desirable to reduce the size of the circuit 124 and respective components to be as small as possible. In order to interconnect very small chips 154 with antennas 122, it is known to use structures known as straps, interposers, and carriers to facilitate device manufacture. Straps include conductive leads or pads that are electrically coupled to the contact pads of the chips for coupling to the antennas. These pads provide a larger effective electrical contact area than a chip precisely aligned for direct placement without a strap. The larger area increases the tolerance allowed for placement of chips during manufacture while still providing effective electrical connection. Accordingly, in these embodiments, the circuit 124 may include conventional RFID transponders such as disclosed in U.S. Pat. No. 6,107,920 (FIGS. 14 and 15 show a package blank with directly formed antenna, and RF identification circuit chip antenna secured to the package surface); U.S. Pat. No. 6,259,369 (antenna sections printed in conductive ink on a package or envelope, with a label containing an RFID bridging the antenna sections); and U.S. Pat. No. 6,667,092 (capacitive antenna having two pads separated by a gap embedded in packaging linerboard, with an interposer including an RF processor coupled between the antenna pads). The disclosures of these prior patents are incorporated herein by reference in their entirety.

In view of the foregoing, in a number of embodiments the tag 112 may be described as including a first antenna 122a for transceiving (i.e., transmitting and receiving) energy E to and from a reader 108 along a line of sight, a second antenna 122b without a line of sight to a reader 108 for transceiving energy to and from another one of the tags 112, and circuitry for allowing or enabling energy to pass between the two antennas. In some of the embodiments, the circuitry may include a transmission line 126. In other embodiments, passing of energy between the antennas 122 may be controlled by an RFID chip 154 or other structure (e.g., a switch 156). In further embodiments, the energy passed between the antennas 122 may be modified by an RFID chip 154 or other structure (e.g., an amplifier 158).

In addition, in many embodiments, the tag 122 may include a pair of antennas 122 that are both capable of transceiving energy E to and from a reader 108 and energy T to and from another tag 112; for example, both of the antennas 122 may include free-space antennas. In these embodiments, at least one (or both) of the antennas 122 may receive energy from a reader 108 or energy from another one of the tags 112.

In other embodiments, the tag 112 may include a first antenna 122a that is capable of transceiving energy E to and from a reader 108 and energy T to and from another tag 112 and a second antenna 122b that is capable of transceiving energy T to and from another tag 122; for example, the first antenna 122a may include a free-space antenna, and the second antenna 122b may include a proximity coupler. In these embodiments, only the first antenna 122a may receive energy from a reader 108.

Those skilled in the art will understand that the preceding embodiments of the present invention provide the foundation for numerous alternatives and modifications thereto. For example, the reader 106 and the computer 108 may be integrated as a single unit for reading and processing information associated with the load 102. In addition, the tags 112 may be applied or integrated with objects that have shapes other than the rectilinear box illustrated herein. Further, the tags 112 may be printed directly onto the object 110. Still further, the transmission line 126 may be a conductive tape that is cut to a desired length to couple with the antennas 122 and the RFID circuit 124. Additionally, the RFID tags 112 may be disposed on, mounted to, or integrated with any type of object that is desired to be read other than objects as described. These other modifications are also within the scope of the present invention. Accordingly, the present invention is not limited to that precisely as shown and described in the present invention.

What is claimed is:

1. A radio-frequency identification (RFID) tag for use with a reader that generates activation energy, the RFID tag comprising:
   a pair of antennas for receiving activation energy;
   an RFID circuit for modulating tag energy when activation energy is received by at least one of the antennas and for modulating tag energy when tag energy is received by at least one of the antennas, wherein the antennas and the RFID circuit are each disposed on a respective substrate;
   a transmission line for operatively coupling the RFID circuit to the antennas, wherein the transmission line includes a plurality of adhesively mountable segments each electrically coupled to a respective one of the antennas and the RFID circuit, the antennas and the RFID circuit being separate adhesively mountable segments;
   a first one of the antennas for receiving activation energy;
   a second one of the antennas for radiating activation energy received by the first antenna and for receiving tag energy radiated by an antenna of another RFID tag; and
   the first antenna for radiating the tag energy received by the second antenna from the other RFID tag;
   whereby when a plurality of the RFID tags are positioned in sequence in operative proximity with each other, activation energy is propagated through the sequence from one RFID tag to another in one direction, and tag energy is propagate through the sequence from one RFID tag to another in another direction.

2. The RFID tag of claim 1 wherein the antennas are mounted to a side of an object such that the antennas are disposed at or near respective opposing edges of the side of the object.

3. The RFID tag of claim 1 wherein the antennas are mountable to an object such that the antennas are disposed on opposing sides of the object.

4. The RFID tag of claim 1 wherein each of the substrates includes an adhesive layer.

5. The RFID tag of claim 1 wherein each of the segments of the transmission line is able to be coupled to another segment through capacitance.

6. The RFID tag of claim 1 wherein at least one of the antennas includes a free-space antenna.

7. The RFID tag of claim 1 wherein at least one of the antennas includes a proximity coupler.

8. The RFID tag of claim 1 wherein at least one of the antennas includes a dipole antenna.

9. The RFID tag of claim 1 wherein at least one of the antennas includes a notch antenna.

10. The RFID tag of claim 1 wherein at least one of the antennas includes a Yagi antenna.

11. The RFID tag of claim 1 wherein at least one of the antennas is configured to radiate energy in two dimensions.

12. The RFID tag of claim 1 further comprising a plurality of antennas configured to radiate energy in three dimensions.

13. The RFID tag of claim 1 wherein the RFID circuit includes an RFID chip a switch for coupling the chip to the first antenna and for decoupling the chip from the first antenna when the RFID tag has been read by the reader.

14. The RFID tag of claim 1 wherein the RFID circuit includes an RFID chip and an amplifier for amplifying the tag energy received by the second antenna.

15. The RFID tag of claim 1 wherein the RFID circuit includes an RFID chip having a variable input impedance, the variable input impedance including a first state in which the RFID chip absorbs energy from the transmission line, a second state in which energy from the transmission line is reflected back, and a third state in which the amount of energy absorbed byte RF chip is minimized, thereby maximizing the amount of energy passed on to next RFID tag.

16. A method for enabling an object to be read by an RFID reader, the method comprising:
providing an object having a side with a dimension defined between opposing edges;
providing an RFID tag including:
a pair of antennas for receiving activation energy;
an RFID circuit for modulating tag energy when activation energy is received by one of the antennas; and
a transmission line for operatively coupling the RFID circuit to the antennas;
a first one of the antennas for receiving activation energy;
a second one of the antennas for radiating activation energy received by the first antenna and for receiving tag energy radiated by an antenna of another RFID tag;
the first antenna for radiating the tag energy received by the second antenna from the other RFID tag;
mounting the RFID tag to the side of the object such that the first antenna is disposed at or near one of the edges of the side of the object and the second antenna is disposed at or near the other edge of the side of the object;
wherein the antennas and the RFID circuit are each disposed on a respective substrate with a transmission line segment coupled thereto, thereby defining a pair of antenna sections and an RFID circuit section, the mounting step comprising:
mounting the antenna sections to the side of the object; and
mounting the RFID circuit section to the side of the object by aligning and overlapping the transmission line segments of the RFID circuit section with the transmission line segments of the antenna sections.

17. The method of claim 16 wherein the antennas and the RFID circuit are each disposed on a substrate, the mounting step comprising mounting the substrate to the side of the object.

18. The method of claim 17 wherein the substrate includes adhesive, the mounting step comprising adhering the substrate to the side of the object.

19. The method of claim 16 wherein the mounting step includes mounting the RFID tag to the object such that the antennas are disposed on opposing sides of the object.

20. A radio-frequency identification (RFID)-enabled object for use with reader system, the RFID-enabled object comprising:
an object having a top, a bottom, and four sides each having a top edge and a bottom edge; and
RFID tag including:
a top antenna disposed at or near the top edge of one of the sides of the object;
a bottom antenna disposed at or near the bottom edge of the one side of the object;
a transmission line electrically coupled to the antennas; and
an RFID circuit electrically coupled to the transmission line for communicating with the reader system when activated by energy from the reader system;
whereby when a plurality of the RFID-enabled objects are vertically stacked, the bottom antenna of an upper one of the RFID-enabled objects is positioned within communicative proximity with the top antenna of a lower one of the RFID-enabled objects on which the first RFID-enabled object is stacked causing both the bottom antenna of the upper one of the RFID-enabled objects and the top antenna of the lower one of the RFID-enabled objects to switch from antennas configured for receiving and/or transmitting RF energy to antennas configured for coupling in the near field.

21. The RFID-enabled object of claim 20 wherein at least one of the antennas includes a free-space antenna.

22. The RFID-enabled object of claim 20 wherein at least one of the antennas includes a proximity coupler.

23. The RFID-enabled object of claim 20 wherein at least one of the antennas includes a dipole antenna.

24. The RFID-enabled object of claim 23 wherein the dipole radiator includes a pair of radiating elements disposed substantially parallel to the edges.

25. The RFID-enabled object of claim 24 wherein the dipole radiator includes a first radiating element disposed substantially parallel to the edges and a second radiating element disposed substantially perpendicular to the edges.

26. The RFID-enabled object of claim 20 wherein at least one of the antennas includes a notch antenna.

27. The RFID-enabled object of claim 20 wherein at least one of the antennas includes a Yagi antenna.

28. The RFID-enabled object of claim 20 wherein the RFID tag further includes a substrate on which the antennas, the transmission line, and the circuit are disposed.

29. The RFID-enabled object of claim 28 wherein the substrate includes adhesive for adhering to the object.

30. A method for reading a stack of radio-frequency identification (RFID)-enabled objects, each of the RFID-enabled objects having atop, a bottom, and four sides, the method comprising:
providing a stack of RFID-enabled objects each including:
an object having a top, a bottom, and four sides each having a top edge and a bottom edge; and
an RFID tag including:
a top antenna disposed at or near the top edge of one of the sides of the object;
a bottom antenna disposed at or near the bottom edge of the one side of the object;
a transmission line coupled to the antennas; and
an RFID circuit electrically coupled to the transmission line for communicating with the reader system when activated by energy from the reader system;
wherein the bottom antenna of an upper one of the RFID-enabled objects is positioned within communicative proximity with the top antenna of a lower one of the RFID-enabled objects on which the first RFID-enabled object is stacked;
causing both the bottom antenna of the upper one of the RFID-enabled objects and the top antenna of the lower one of the RFID-enabled objects to switch from antennas configured for receiving and/or transmitting RF energy to antennas configured for coupling in the near field.

31. A radio-frequency identification (RFID) tag for an object, the RFID tag comprising:
- a substrate;
- a pair of antennas disposed on the substrate;
- a transmission line electrically coupled to the antennas; and
- a circuit electrically coupled to the transmission line and for being activated by energy;
- the substrate for mounting to one of the sides of the object such that:
- one of the antennas is disposed at or near an edge of the side of the object; and
- the other antenna is disposed at or new an opposing edge of the side of the object;
- one of the antennas for receiving energy; and
- the other antenna for radiating the received energy;
- whereby when the RFID tag is mounted to one of the sides of the object and the object is stacked with another object having an RFID tag mounted similarly to one of its sides, the antenna for radiating the received energy is positioned in communicative proximity to the antenna for receiving energy of the other object causing the antenna for radiating the received energy and the antenna for receiving the energy to switch from antennas configured for receiving and/or transmitting RF energy to antennas configured for coupling in the new field.

32. The RFID tag of claim 31 wherein each of the antennas is configured for receiving and radiating energy.

* * * * *